INVENTOR.
Adolf Von Wangenheim
BY
Andrew K. Foulds
his ATTORNEY

United States Patent Office 2,714,759
Patented Aug. 9, 1955

2,714,759
APPARATUS FOR CLOSING AND STANDARDIZING THERMOSTATIC POWER ELEMENTS

Adolf Von Wangenheim, Detroit, Mich., assignor to Detroit Controls Corporation, a corporation of Michigan Application September 29, 1949, Serial No. 118,659

2 Claims. (Cl. 29—33)

This invention relates to a new and improved apparatus for calibrating or standardizing accurately thermostatically operated or energized power elements and more particularly the type of power elements which have a substantially rigid casing containing an expansive material.

One of the objects of this invention is to provide a novel apparatus for the standardization or calibration of such thermostatic power elements.

Another object is to provide a novel apparatus for calibration or standardization of thermostatic power elements of the fusible expansive type.

Another object is to provide an improved apparatus whereby thermostatic power elements may be calibrated or standardized, both automatically and accurately.

Other objects will become apparent from time to time throughout the specification and claims as hereinafter related.

This invention comprises the new and improved apparatus for carrying out the calibration or standardization which will be described more fully hereinafter and the novelty of which will be particularly pointed out and distinctly claimed.

Figures 1, 2:
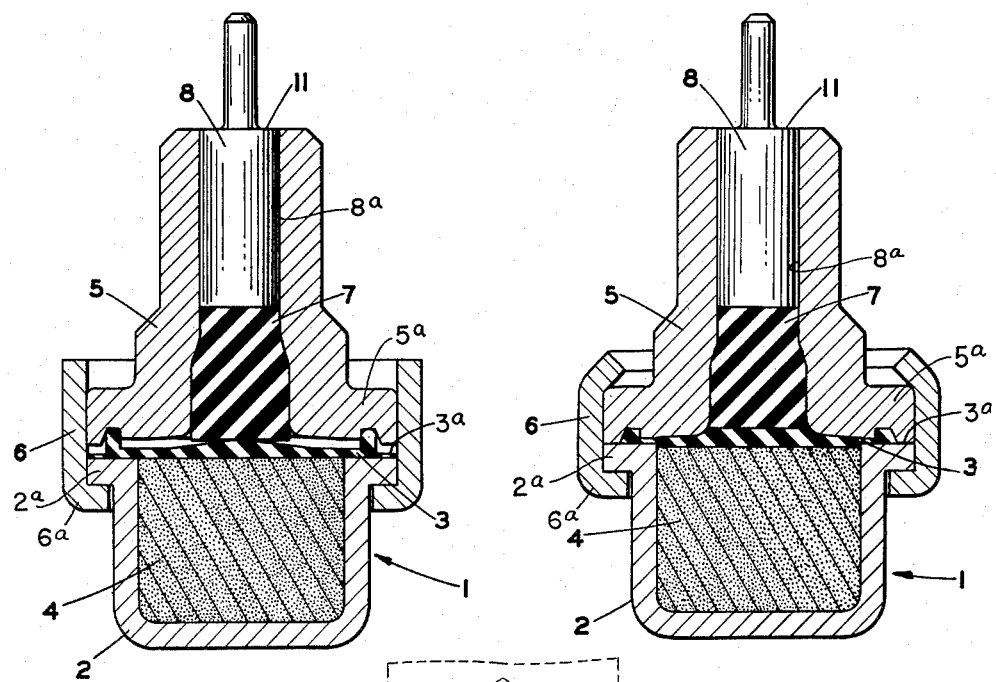
Figure 3:
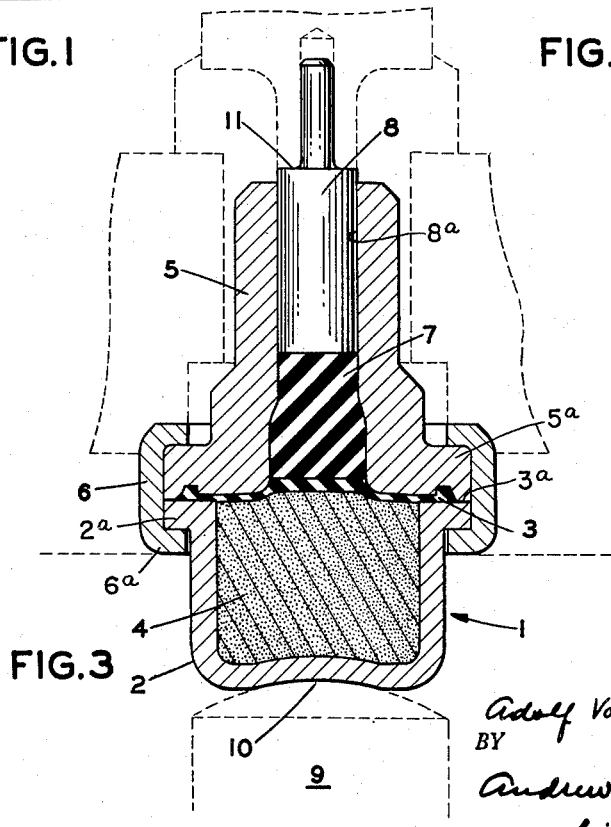
Figure 4:
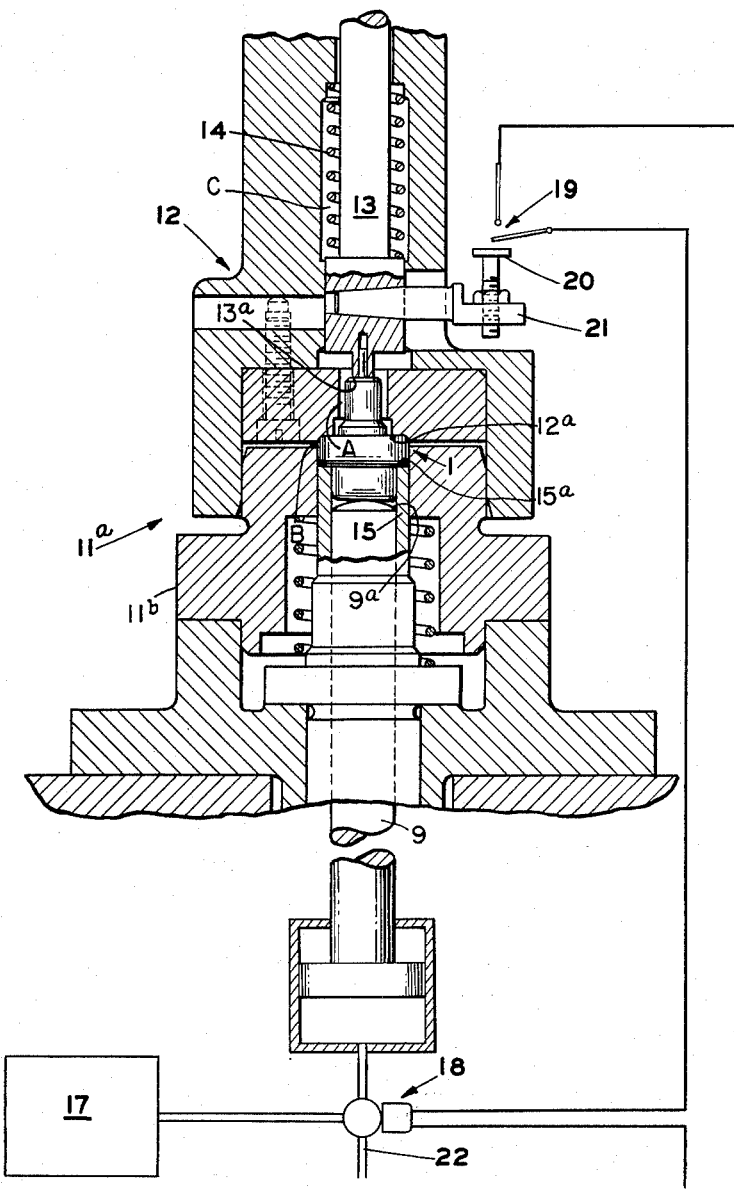

In the accompanying drawings to be taken as part of this specification, there are clearly and fully illustrated the appartaus for and the several distinct steps in the standardization and calibration in which drawings:

Figure 1 is a sectional view of a power element which is to be calibrated in a preliminary state of assembly, Fig. 2 is a sectional view of the power element shown in Fig. 1 with the parts in a further stage of assembly, Fig. 3 is a sectional view of the power element as is shown in Figs. 1 and 2 which is fully assembled and calibrated, and Fig. 4 is a view similar to Fig. 3 showing the portion of the apparatus in section for carrying out the calibration and showing diagrammatically the system whereby the power element may be calibrated automatically.

Figures 1, 2 and 3 are shown to illustrate the various stages of assembly of the power element when it is positioned in the apparatus for calibration or standardization.

Referring to the drawings by characters of reference there is shown in the various figures a fusible expansible power element of the type known in the trade as a "Vernay" element. This type of power element is shown and described more completely in Patents 2,259,846; 2,368,181 and 2,636,776 granted April 28, 1953, to Sergius Vernet and since the said elements are well known only the briefest description of the thermostatic operation will be set forth as to the power element itself.

The power element shown in Fig. 1 comprises a cup-shaped casing 2 having a rim portion or outwardly facing annular supporting surface 2a. The cup shaped casing 2 has a diaphragm 3 preferably a pliable, elastomeric material or other rubber-like material similar to the thrust transmitting plug 7 covering the open end thereof and enclosing a fusible and expansive charge 4, preferably a mixture of fusible waxes and heat transferring metallic powder, the mixture having a high rate of expansion upon change of state. The diaphragm 3, as described in Patent 2,636,776, has a thin "flash-like" annular edge portion 3a of substantially paper-thick thinness, say five thousandths (.005) inch thick, for example. A guide member 5 which has a peripheral portion or flange 5a and thus serves as a cover or closure member, fits over the diaphragm 3 and is held in position by an annular collar 6 having an inwardly directed flange 6a which engages the end wall side of the rim portion 2a and a side wall marginal portion spaced from said annular inwardly directed flange. A thrust transmitting plug of rubber or rubber-like material 7 is positioned in the guide member 5 to transmit motion from the diaphragm 3 to a movable piston 8 upon expansion of the power element charge 4. The movable piston 8 is reciprocally movable in guideway 8a in the guide member 5. In Figs. 2 and 3 the collar 6 is shown in successive stages of inward folding around or over and upon the lower flange 5a of the guide member, all being in the process of assembly or closing of this power element. In commercial practice these power elements are made of uniform size in large quantitities and it has been found desirable to provide a means for quick and accurate calibration or standardization of these elements. When assembled these power elements contain a fixed and predetermined quantity of the expansible material 4 which upon a given rise of temperature will provide a predetermined travel of the piston 8. However, it has been found that due to slight variations in the size of the cup 2, the diaphragm 3, and the plug member 7 the piston 8 may vary slightly in its initial position as shown in Fig. 2. To insure that the initial position of the piston 8 is correct for operation of the valve or switch or other control device with which this power element is to be used, it is necessary to adjust the piston 8 to an initial position which is a predetermined distance above the end of the guide sleeve 5. To accomplish this initial calibration or standardization of the power element, it is placed in a calibrating jig which is indicated by the dotted lines in Fig. 3 and by the mechanism shown in Fig. 4. The power element is then indented by a movable ram or plunger 9 having a curved end portion 9a which is forced against the bottom or end wall of the cup 2, as indicated at 10, until the shoulder 11 on the plunger 8 protrudes a predetermined distance above the face of the guide sleeve 5.

In Fig. 4 there is shown an assembly and system whereby the aforementioned calibration is completed automatically. The power element 1 at the stage of assembly shown in Fig. 2 is placed in a hydraulic press 11a having a supporting structure 11b, which includes sleeve 15, the collar 6 then being closed to the form shown in Fig. 3 by downward movement of an upper pressure or abutment member 12 having a bore A with a surrounding annular supporting portion 12a. Thus the cover or closure element 5 tightly squeezes the paper-thin edge portion 3a against the annular rim portion 2a. The flash flange or portion 3a fills up any cavities which may remain between the cover member flange 2a and the rim portion 3a. Thus the power element 1 is located within a cavity generally indicated by the reference character B, which cavity is defined by the space enclosed between annular supporting surfaces of the abutment member 12 and supporting structure 11b, and includes the adjacent portions of the bores in said structure and said member. In this forming operation the projecting end of the piston 8 fits into a recess in a plunger 13 having a flat end portion 13a. The plunger 13 is carried by the upper abutment member 12 and held in position by a spring 14 with its flat end 13a abutting the power element. The abutment member is bored to receive the plunger 13 as generally indicated by reference character C. The lower portion of the annular collar 6 is held tightly against the upper member 12 by being positioned in the bore of a guide sleeve 15 and supported by an annular supporting portion 15a. A ram or plunger 9 is slidably positioned in the bore of sleeve 15 and reciprocally movable to calibrate the power element. The plunger 9 is moved by hydraulic pressure from a pressure source, indicated diagrammatically as 17, controlled by an electric valve 18. The operation of the valve 18 is controlled by a switch, shown diagrammatically at 19, which in commercial construction would preferably be a "Micro" switch arranged for operation by an adjustable screw 20 carried by a laterally projecting arm 21 on the plunger 13. In operation, the valve 18 is normally positioned to be ready to supply pressure from the source of hydraulic pressure 17 to the calibrating plunger 9 and is operable upon energization to open and "dump" the pressure through an outlet port as at 22 to prevent further movement of the plunger 9. When pressure is supplied to the plunger 9 it is moved upward engaging the bottom of the power element cup 2 to indent it, so as to force the power element charge against and to move the diaphragm 3 and thrust transmitting plug 7 until the piston 8 is moved a predetermined distance. As the piston 8 is moved upward upon indentation of the power element cup by the plunger 9 the upper plunger 13 is moved against the force of the spring 14 and upon moving a predetermined distance engages the screw 20 with the "Micro" switch 19 which energizes the electrically operated valve 18 and "dumps" the hydraulic pressure to prevent further movement of the plunger 9. By this arrangement it is possible to calibrate or standardize large quantities of the power elements automatically and with great rapidity and to accurately set the initial amount of plunger or piston travel beyond the end of the guide sleeve 5.

It is to be understood that the heretofore described closing and standardizing operations are performed at a standard or predetermined temperature so that the initial set or distance the piston 8 extends beyond the guide member 5 is the same for all power elements at the standard or predetermined temperature.

Having thus described the invention what is claimed and desired to be secured by Letters Patent of the United States is:

1. An apparatus for closing and standardizing a thermostatic power element which comprises a cup portion with a bottom wall and an outwardly facing annular supporting surface, a closure element having a peripheral portion seatable on said outwardly facing annular supporting surface, a diaphragm member positioned between said outwardly facing surface and said peripheral portion, temperature responsive material within said cup portion, said closure element having a guideway extending substantially normal to said diaphragm member, and thrust means reciprocal in said guideway and having cooperable relation with said diaphragm member for movement thereby; said apparatus comprising a supporting structure having a bore with a surrounding annular supporting portion, an abutment member positioned adjacent to and movable toward and away from said supporting portion, indenting means positioned in said bore and reciprocally movable therein, said apparatus being adapted to close and standardize a thermostatic power element positioned in said bore, said first-named annular supporting surface adapted to support said cup portion, said abutment member positioned in overlying relation to said closure element peripheral portion and movable to urge said peripheral portion toward said outwardly facing supporting surface and to compress said diaphragm member between said peripheral portion and said outwardly facing annular supporting surface thereby closing said thermostatic power element, said indenting means being movable to deform inwardly said cup portion bottom wall to move said thrust means outwardly to a position at a predetermined distance from said supporting structure, and means operable to limit movement of said indenting means upon attainment of said position thereby standardizing said thermostatic power element.

2. An apparatus for closing and standardizing a thermostatic power element which comprises a cup portion with a surrounding rim portion and an end wall spaced from said rim portion, a closure element having a peripheral portion seatable on said rim portion, a diaphragm member positioned between said rim portion and said peripheral portion, temperature responsive material substantially filling said cup portion, said closure element having a guideway extending substantially normal to said diaphragm member, thrust means reciprocal in said guideway and extending therefrom and having cooperable relation with said diaphragm member for movement thereby, a ring member with an annular inwardly directed flange engaging the end wall side of said rim portion and having a side wall marginal portion spaced from said annular inwardly directed flange; said apparatus comprising a supporting structure having a bore with a surrounding annular supporting portion, an abutment member having a bore with a surrounding annular supporting portion, said abutment member positioned with its surrounding annular supporting portion adjacent to said annular supporting portion of said supporting structure thereby forming a cavity therebetween, said abutment member movable toward and away from said supporting structure, said bore in said abutment member being aligned with said bore in said supporting structure, a plunger positioned in said first named bore and reciprocally movable therein, said plunger having a curved end portion adjacent to said cavity, means to move said plunger in said first named bore, a second plunger positioned in said second named bore and reciprocally movable therein, said second named plunger having a flat end portion adjacent to said cavity, means to yieldingly urge said second named plunger toward said supporting structure, means secured to said second named plunger and operable upon predetermined movement of said second named plunger away from said supporting structure to stop movement of said first named means; said apparatus being adapted to close and standuardize a thermostatic power element positioned in said first-named bore, said first-named annular supporting portion adapted to support said flanged portion of said ring member, said abutment means positioned in opposing relation to said closure element peripheral portion and said second named bore adapted to receive said closure element, said abutment member movable to compress said marginal portion of said ring member toward said rim portion thereby compressing said diaphragm member between said peripheral portion and said rim portion and clamping said peripheral portion to said rim portion thereby closing said thermostatic power element, said first named plunger movable toward said end wall of said cup portion and operable to deform inwardly said cup portion end wall to move said thrust means outwardly from said guideway against said flat end portion of said second named plunger until said second named plunger is moved to a position a predetermined distance away from said supporting structure, and said second named means operable to limit movement of said first named plunger upon attainment of said position thereby standardizing said thermostatic power element.

References Cited in the file of this patent

UNITED STATES PATENTS

| | | |
|---|---|---|
| 1,063,349 | Hodgkinson | June 3, 1913 |
| 1,442,134 | Dunajeff | Jan. 16, 1923 |
| 1,694,164 | Crosthwait | Dec. 4, 1938 |
| 1,893,388 | Bayer | Jan. 3, 1933 |
| 1,994,388 | Erichsen | Mar. 12, 1935 |
| 2,194,414 | Battermann | Mar. 19, 1940 |
| 2,208,149 | Vernet | July 16, 1940 |

FOREIGN PATENTS

| | | |
|---|---|---|
| 386,505 | Great Britain | Jan. 19, 1933 |